US010583370B2

(12) United States Patent
Fattal

(10) Patent No.: US 10,583,370 B2
(45) Date of Patent: Mar. 10, 2020

(54) DIGITAL AUDIO PLAYER WITH PICTURE DISCS

(71) Applicant: Billboard Studio B.V., Amsterdam (NL)

(72) Inventor: Basile Fattal, Amsterdam (NL)

(73) Assignee: Billboard Studio B.V., Amsterdam (NL)

( * ) Notice: Subject to any disclaimer, the term of this patent is extended or adjusted under 35 U.S.C. 154(b) by 0 days.

(21) Appl. No.: 16/029,426

(22) Filed: Jul. 6, 2018

(65) Prior Publication Data

US 2019/0015759 A1 Jan. 17, 2019

Related U.S. Application Data

(60) Provisional application No. 62/533,367, filed on Jul. 17, 2017.

(51) Int. Cl.

| | |
|---|---|
| ***A63H 33/26*** | (2006.01) |
| ***A63H 5/00*** | (2006.01) |
| ***H04R 1/02*** | (2006.01) |
| ***G06F 3/16*** | (2006.01) |

(52) U.S. Cl.

CPC ............... *A63H 33/26* (2013.01); *A63H 5/00* (2013.01); *G06F 3/165* (2013.01); *H04R 1/028* (2013.01); *A63H 2200/00* (2013.01)

(58) Field of Classification Search

CPC ...... A63H 5/00; A63H 2200/00; A63H 33/26; G06F 3/16; G06F 3/165; H04R 1/028

USPC ....... 434/308, 309, 310, 311, 312, 313, 314, 434/315, 316, 317, 318, 319, 320, 321; 446/137, 175

See application file for complete search history.

(56) References Cited

U.S. PATENT DOCUMENTS 5,254,007 A * 10/1993 Eagan .................... A47D 1/008 108/43
5,451,178 A * 9/1995 Yorozu .................... A63H 5/00 434/311
5,466,158 A * 11/1995 Smith, III ............... A63F 9/183 273/236
5,839,902 A * 11/1998 Wood ..................... G09B 5/062 434/130
6,514,078 B1 * 2/2003 Jones ...................... G09B 5/06 434/104
9,311,822 B2 * 4/2016 Lam ......................... G09B 5/06

(Continued)

FOREIGN PATENT DOCUMENTS

WO 2011-083834 A1 7/2011

OTHER PUBLICATIONS

International Search Report and Written Opinion dated Dec. 17, 2018 for International Application No. PCT/IB2018/000859, filed Jul. 6, 2018, all pages.

*Primary Examiner* — Vishu K Mendiratta

(74) *Attorney, Agent, or Firm* — Kilpatrick Townsend & Stockton LLP

(57) ABSTRACT

A digital audio player device comprises a set of switches that activate audio files stored on a flash memory or on another device linked via wireless technology such as Bluetooth. The audio player works in combination with a set of discs featuring pictograms or symbols each of which corresponds to one of the switches. Pressing a pictogram and/or its corresponding switch activates the audio file represented by that pictogram.

24 Claims, 10 Drawing Sheets

(56) References Cited

U.S. PATENT DOCUMENTS

| | | | | |
|---|---|---|---|---|
| 2003/0139113 | A1* | 7/2003 | Wood | A63H 30/00 446/175 |
| 2005/0048457 | A1* | 3/2005 | Ferrigno | A63F 13/08 434/308 |
| 2005/0147952 | A1* | 7/2005 | Morris | G09B 5/04 434/311 |
| 2006/0025036 | A1* | 2/2006 | Boyle | G06F 3/04886 446/175 |
| 2006/0030235 | A1* | 2/2006 | Brumagin | A63H 33/3055 446/175 |
| 2006/0286893 | A1 | 12/2006 | Conaway | |
| 2011/0281652 | A1* | 11/2011 | Laverdiere | G06F 3/0219 463/37 |
| 2014/0248590 | A1* | 9/2014 | McCormick | G09B 5/06 434/157 |
| 2015/0224417 | A1* | 8/2015 | Richardson | A63H 33/26 446/397 |

* cited by examiner

DIGITAL AUDIO PLAYER WITH PICTURE DISCS

CROSS-REFERENCE TO RELATED APPLICATIONS

This application claims priority to U.S. Provisional Application No. 62/533,367, filed Jul. 17, 2017, the disclosure of which is incorporated by reference herein in its entirety.

BACKGROUND OF THE INVENTION

Children want to play and listen to audio content on their own music device. Furthermore, parents want a screen-less device that is not harmful to the vision and mental wellbeing of the child and that contains a lot of fun, educational and safe audio content to entertain the child.

BRIEF SUMMARY OF THE INVENTION

The present invention is in the field of digital audio. More particularly, the invention provides various embodiments of digital audio player devices that work in conjunction with multiple discs or other substrates featuring pictograms or symbols representing various audio content stored in the player.

In one aspect, the digital audio player can play audio files stored on a flash memory or other memory device mounted on the discs, placed in the player or associated with the player. The audio files can also be streaming from another device linked via wireless technology such as Bluetooth. A series of switches are located on the digital audio player device and each switch corresponds to and activates one of the audio files stored on the flash memory or streaming from another device linked via wireless technology such as Bluetooth.

The digital audio player works in conjunction with multiple picture discs representing various audio content. To activate the digital audio files, the disc is placed over the switches of the digital audio player. The disc is held in such a way that each pictogram on the disc corresponds to one of the switches on the player. An audio file can be activated by pressing on the pictogram or on the switch corresponding to that pictogram, which activates the corresponding audio file.

DETAILED DESCRIPTION OF THE INVENTION

The present invention is in the field of digital music. More particularly, it comprises or includes a digital audio player device that works in conjunction with multiple discs or other substrates featuring pictograms representing various audio content stored in the player. In this way, when a user wishes to play a piece of content, the user visually identifies one of the pictograms and then selects it by pressing the pictogram, such as with a finger. When the disc or substrate is depressed in the selected region, the switch beneath that region is activated in order to play the associated content. In some cases, the switch itself can be pressed, with the pictogram being adjacent to the associated switch. As used herein, the term "pictogram" includes but is not limited to visual symbols such as letters, numbers, logos, drawings, or photographs.

The digital music player device 10 comprises or includes several electronic components including a printed circuit board, a microcontroller, an audio amplifier, a digital signal processor, a memory card reader, a speaker, a headphone jack, a battery holder (or rechargeable battery), as well as software that drives the music playback functionalities. Audio files are stored on a flash memory card (or other type of memory) in the digital audio player's memory card reader. Alternatively the flash memory cards are mounted on the picture discs and read when the discs are docked with the digital audio player. A series of switches 12 are located on the digital audio player device. Each switch 12 corresponds to and activates one of the audio files stored on the flash memory. An example of such as switch is a momentary tactile push button switch, membrane switch, dome switch, capacitive switch, light sensor switch or any other type of touch switches. The digital audio player device 10 may include a handle 24 or other mechanism for carrying or holding the digital audio player device 10.

Figure 1:
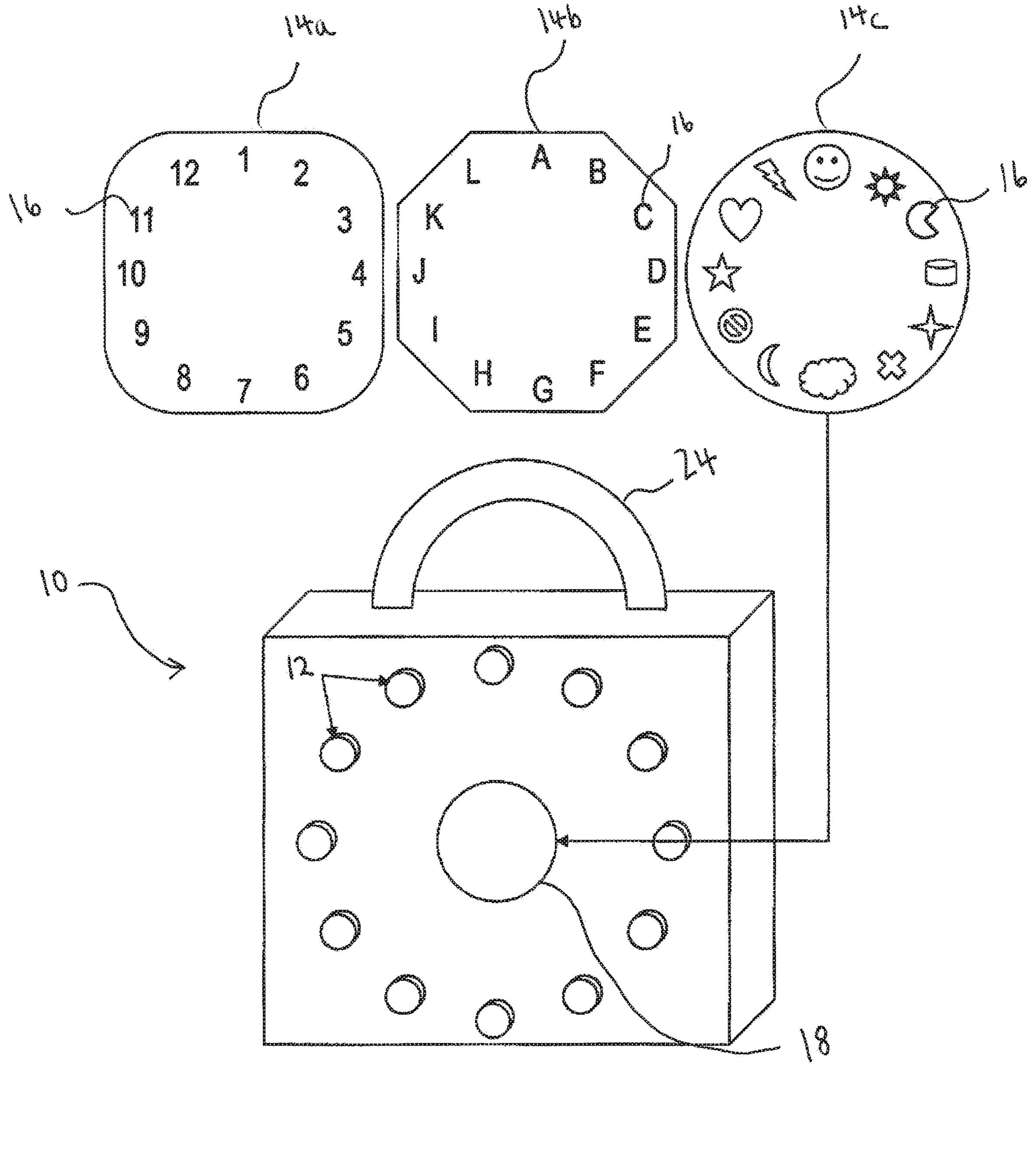
FIG. 1 is a frontal view of the digital audio player with different discs featuring pictograms and symbols representing audio files stored on the flash memory or on another device linked via wireless technology such as Bluetooth.
Figure 2:
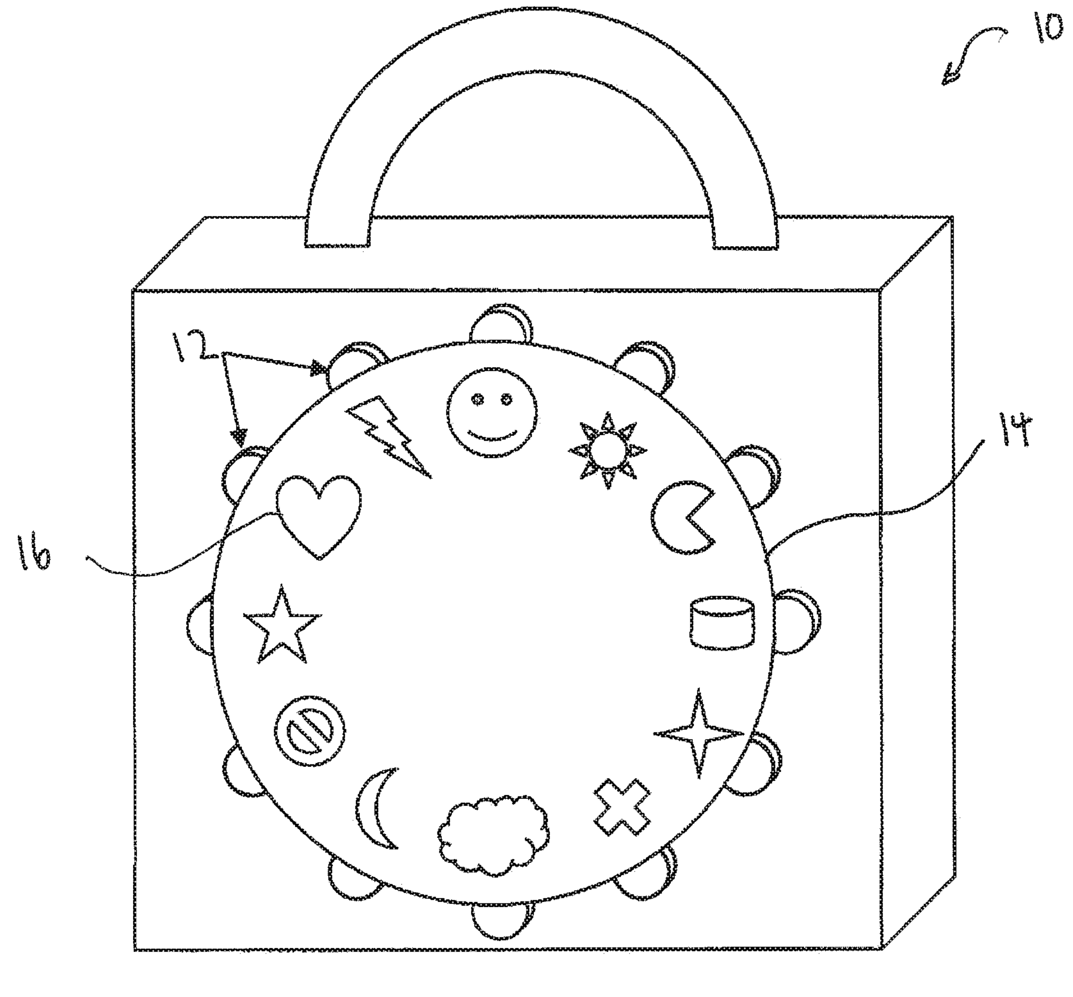
FIG. 2 is a frontal view of the digital audio player with the disc placed on it, showing how each of the images on the disc corresponds to a switch on the audio player.
Figure 3:
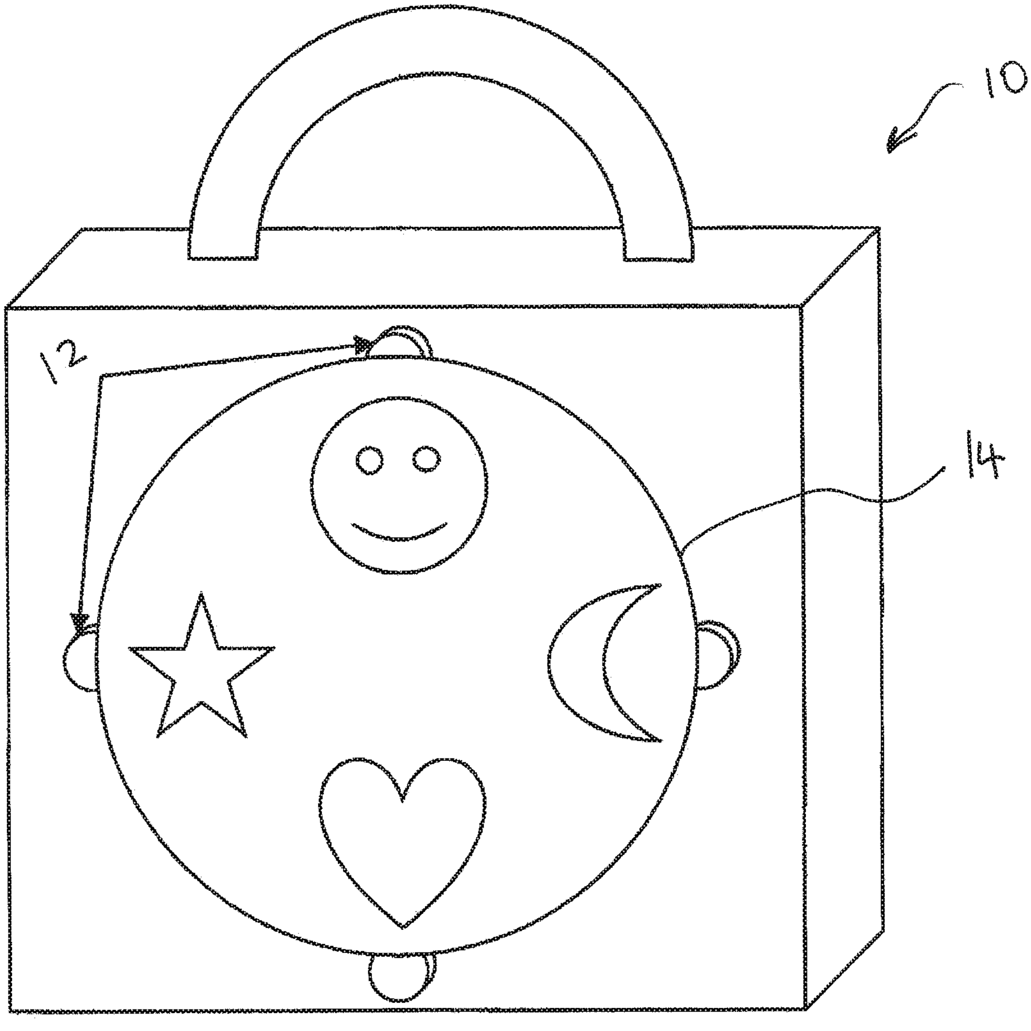
FIG. 3 is a front perspective view of another embodiment of the digital audio player and disc with fewer switches and corresponding pictograms. Any number of switches and pictograms can be placed on the digital audio player and its associated discs. This example shows 4 switches and 4 pictograms.

The digital audio player device 10 works in conjunction with multiple discs 14 representing various audio content. Some examples of discs (e.g., identified individually as 14*a*-14*c*) that could be used are illustrated in FIG. 1.

Figure 4:
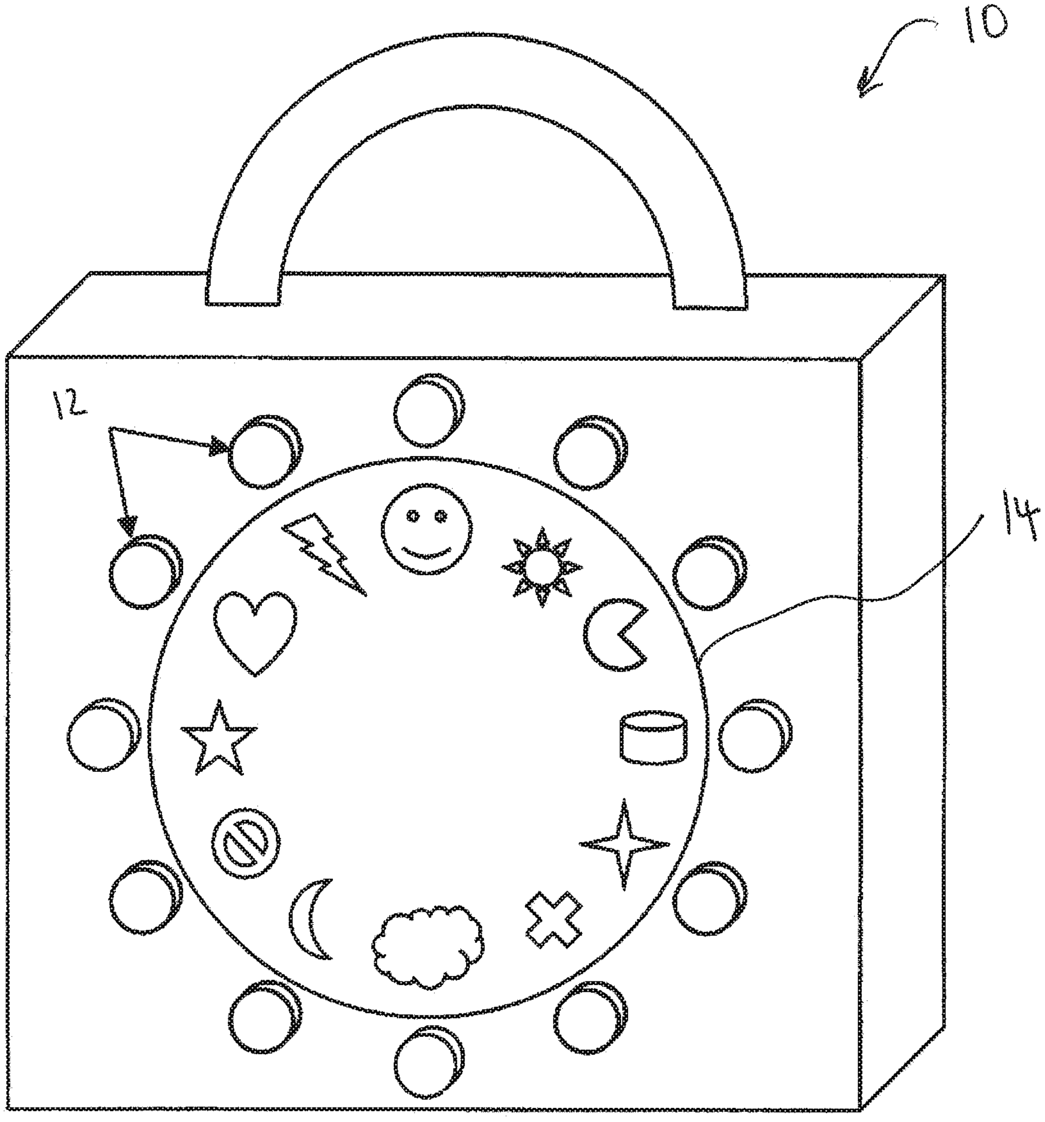
FIG. 4 is a front perspective view of still another embodiment of the digital audio player with the disc held in the center with each pictogram located next to its corresponding switch.
Figure 5:
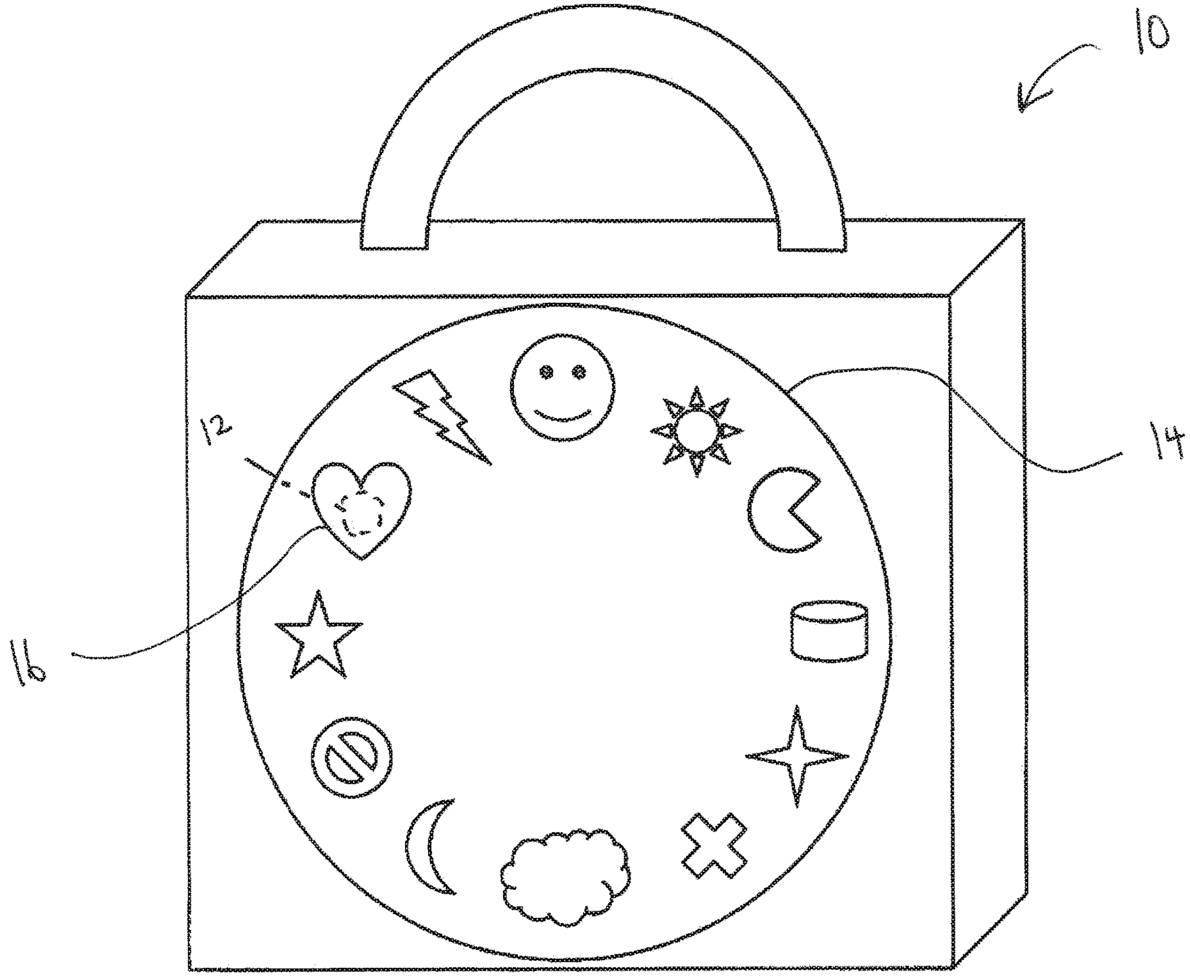
FIG. 5 is a front perspective view of still another embodiment of the digital audio player with the disc held in the center, covering the switches which are behind their corresponding pictograms. Pressing on a pictogram pushes the switch behind it which activates the audio.
Figure 6:
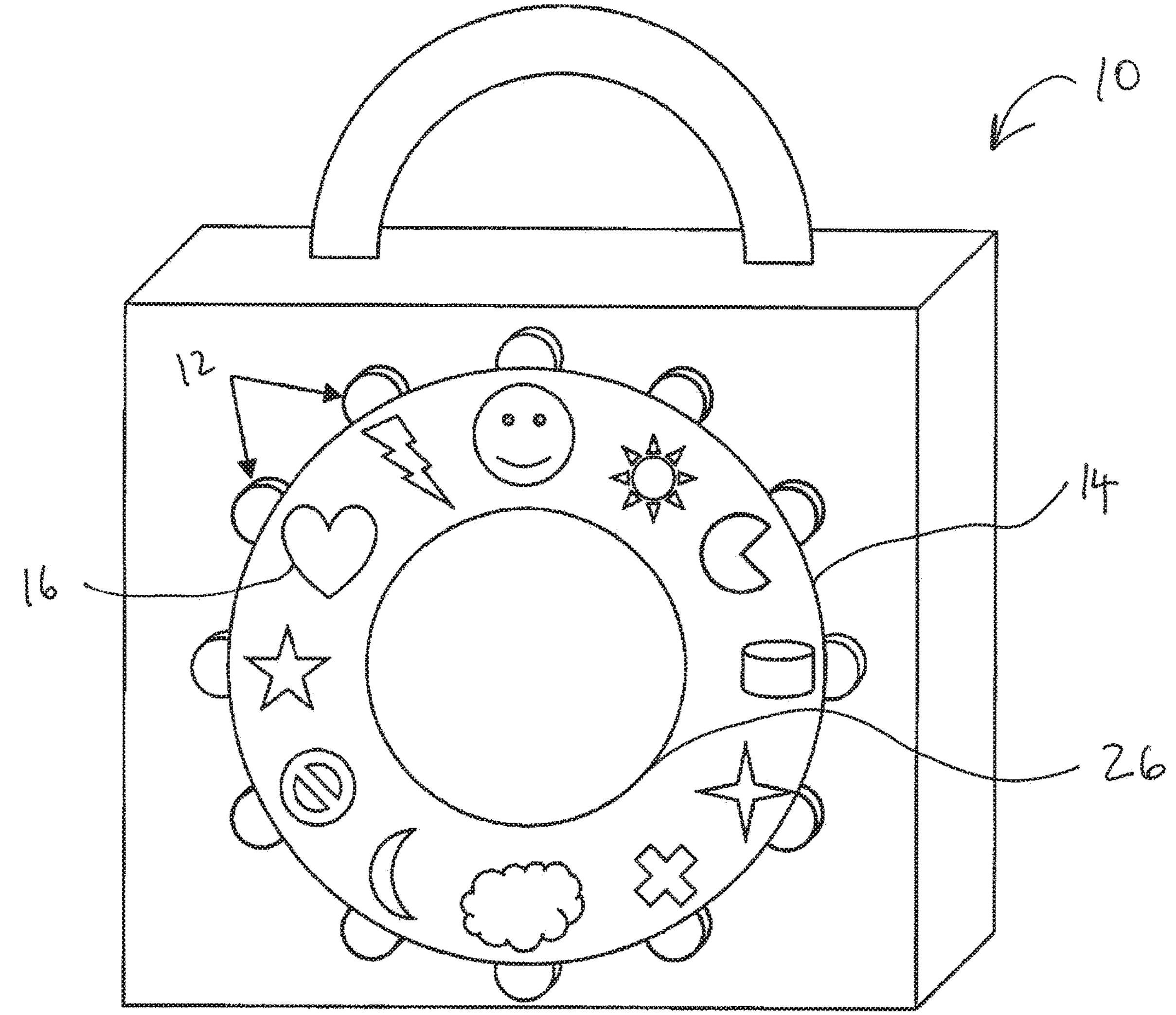
FIG. 6 is a front perspective view of still another embodiment of the digital audio player featuring a disc with a hole 26 in the center. The switches can be located on the outer circumference, inner circumference or behind the disc.
Figure 7:
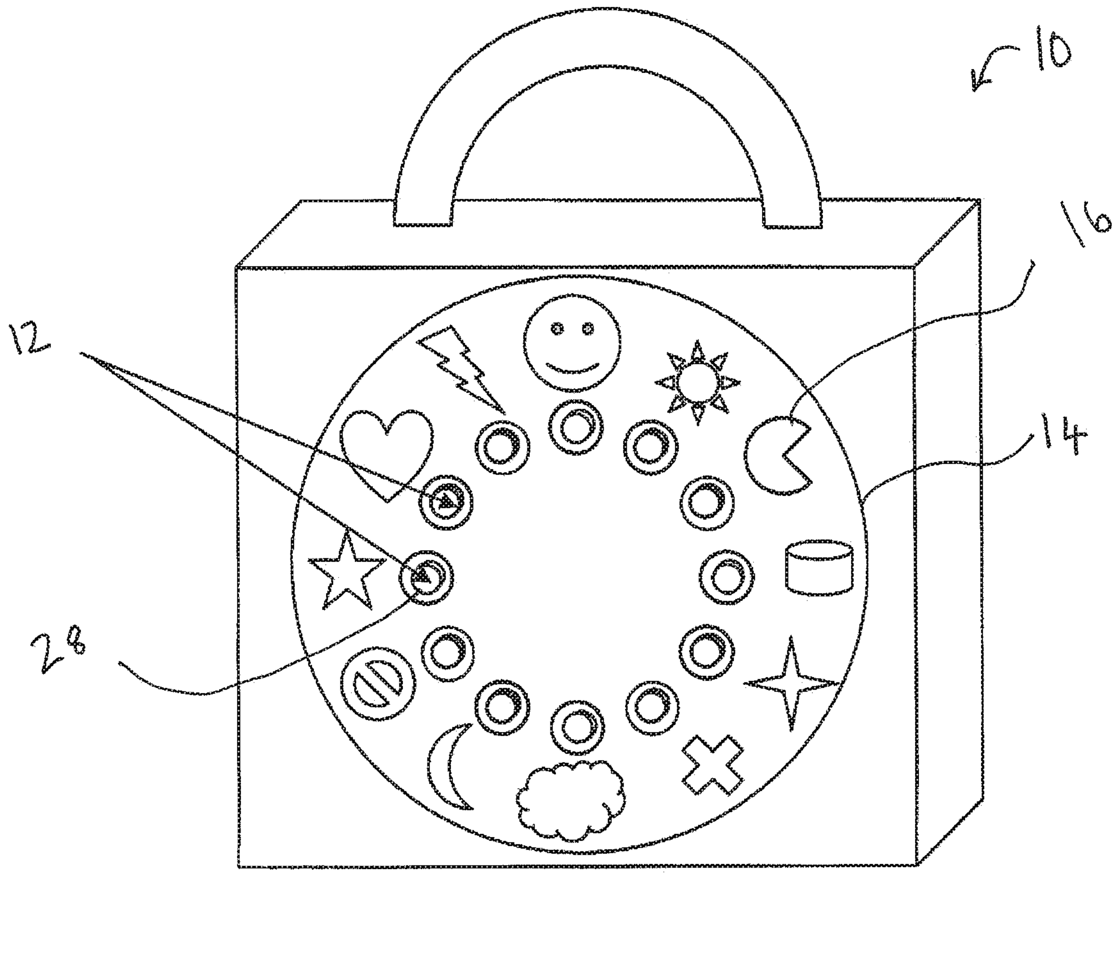
FIG. 7 is a front perspective view of still another embodiment of the digital audio player featuring a disc with several holes 28. Each switch is accessible through each hole located next to a pictogram on the disc. The pictograms can also be located on a transparent surface aligned with each switch.
Figure 8A:
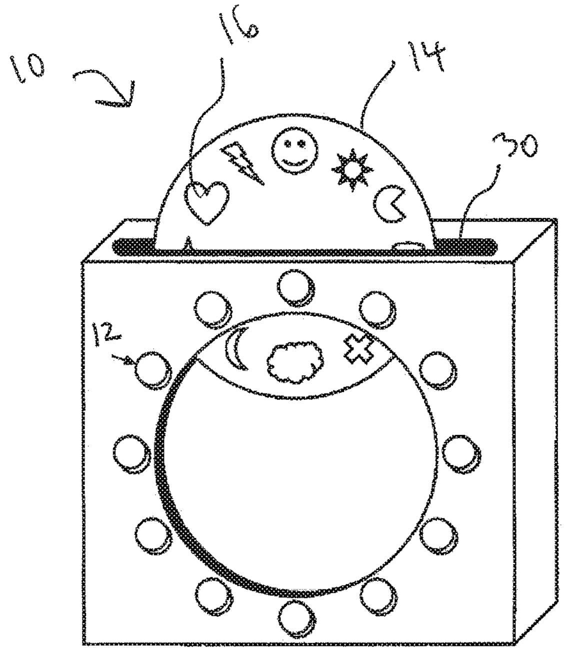
FIGS. 8*a*-8*b* are front perspective views of still another embodiment of the digital audio player with the disc placed inside the digital audio player via a slot 30. The disc's pictograms can be next to each switch as in FIG. 8*a* or the disc's pictograms can be covering each switch as in FIG. 8*b*.
Figure 8B:
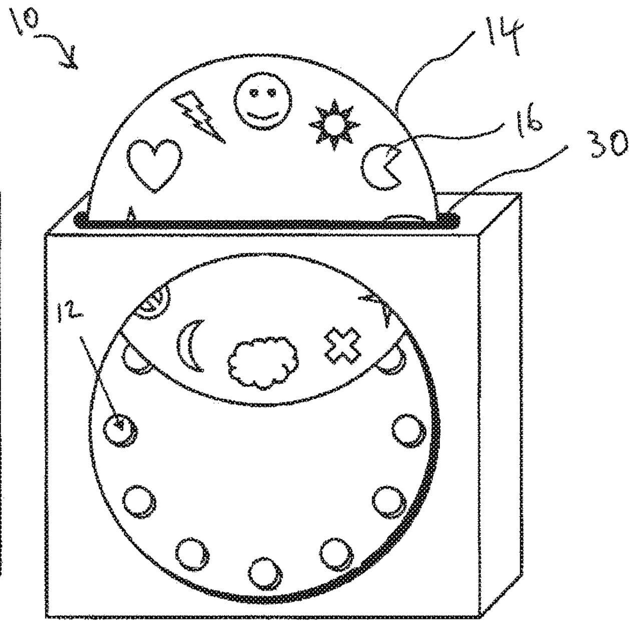
Figure 9:
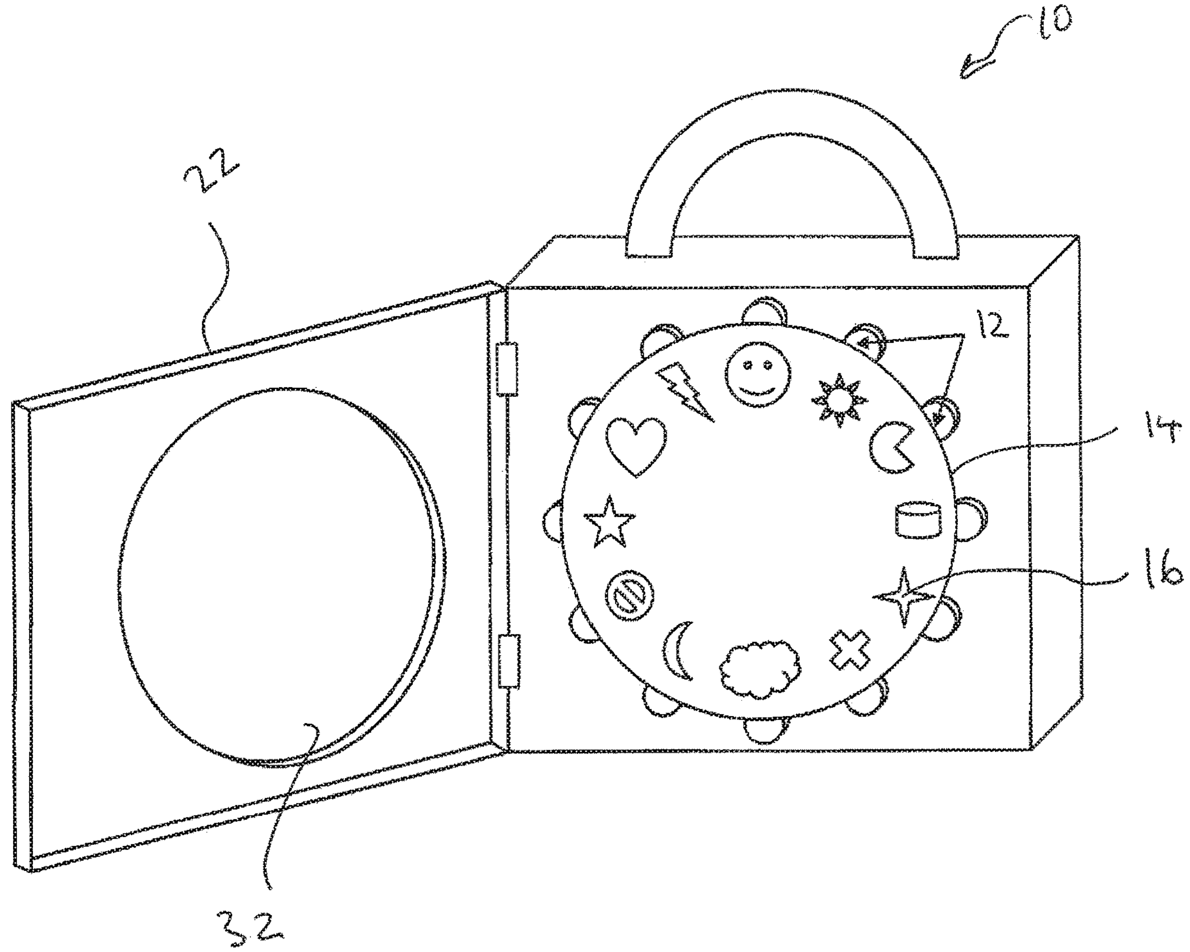
FIG. 9 is a front perspective view of still another embodiment of the digital audio player with the disc placed inside the digital audio player and covered by a lid 22. The lid 22 features an opening 32 giving access to the disc and switches.

Although referred to as "discs", it will be appreciated that other types of substrates could be used. These substrates should be capable of visually displaying a pictogram 16 and, in some embodiments, be somewhat flexible so that when the region corresponding to a pictogram 16 is depressed with a finger, it will activate that associated switch beneath it 12 (e.g., when mounted or otherwise coupled to the digital audio player device), without activating any of the adjacent switches. Examples of materials that could be used to construct the discs 14 include any type of plastic, cardboard, metal such as aluminum or composites. Typically, the discs 14 will have a thickness in the range from about 0.1 mm to about 5 mm. Discs 14 can have several shapes such as circle, triangle, square or uneven shapes. Each disc 14 features pictograms 16 that represent the audio files stored on the flash memory (flash memory is located either in the digital audio player or mounted on the discs) or on another wireless device. To activate the digital audio files, the disc 14 is placed over the switches 12 of the digital audio player 10. The disc 14 is held in such a way that each pictogram on the disc corresponds to one of the switches on the player. In doing so the user can activate the correct audio file by pressing on the pictogram 16 corresponding to the audio file. The switches may be partially covered by the discs as shown in FIGS. 2-4, 6, 7, 8*a* and 9, or fully cover the switches as shown in FIGS. 5 and 8*b*.

Figure 10:
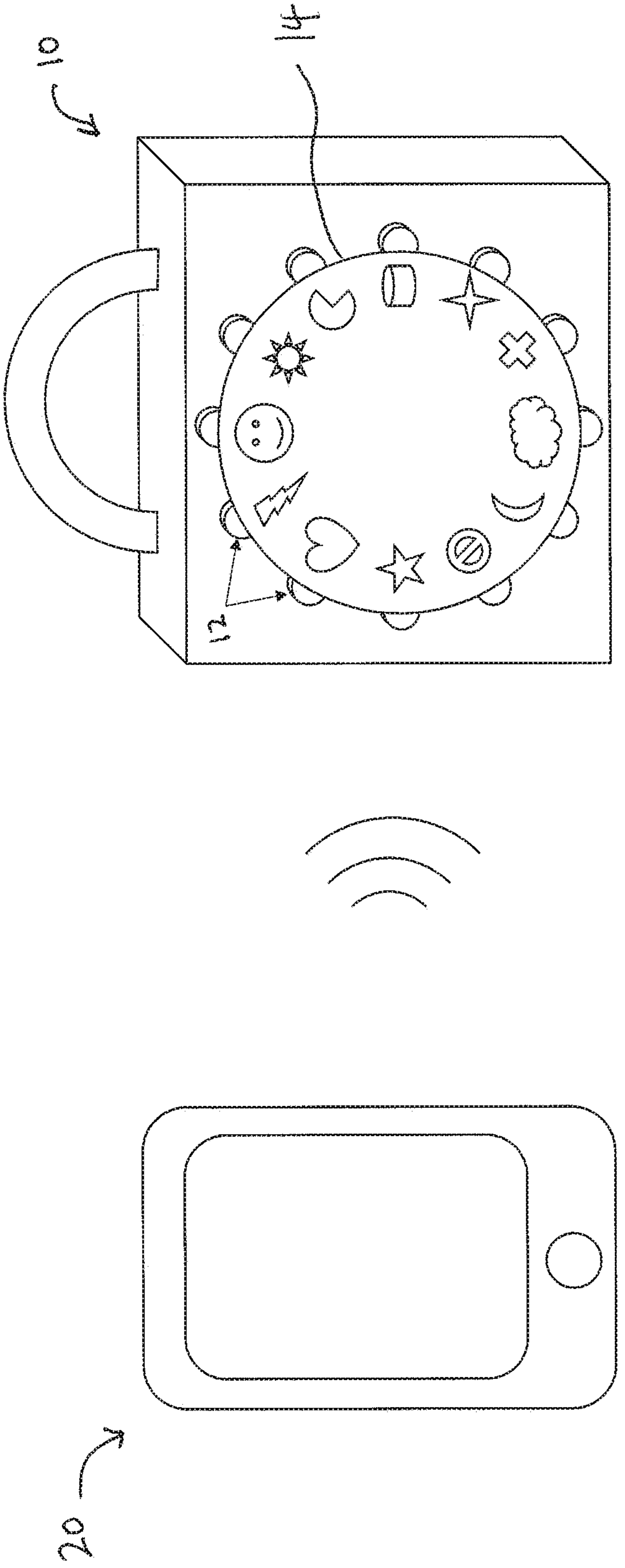
FIG. 10 is a schematic view of another embodiment of the digital audio player configured to be in wireless communication with a second wireless device.

In another embodiment the digital audio player 10 can be mounted or include wireless communication circuitry or other wireless technology such as Bluetooth. The digital audio player would then work in conjunction or be configured to communicate wirelessly with a secondary wireless device 20, such as a laptop, smartphone or tablet, running a special software such as a mobile or other software application linking it to the digital audio player (see FIG. 10). Pressing on a pictogram or switch adjacent to a pictogram on a disc would activate the audio files from the secondary device 20. The files can either be located on that device or streaming directly from the internet using a web-based streaming music service outlet. The audio files could also be downloaded onto the digital audio player's flash memory. FIG. 10 represents the digital audio player 10 playing sounds coming from another wireless device 20.

In some aspects, the disc 14 and/or player 10 may include some type of keying arrangement so that the disc is properly oriented with the switches each time the disc is placed onto the player. For example, if the pictogram is the number ten, the disc will be configured so that each time it is attached to the player, the number ten will be aligned with the switch that repeats "ten" when pressed. One manner of detecting or ensuring the proper orientation or alignment is by positioning a small metallic piece inside the disc, which will be detected by a capacitive switch inside the player. For example, when the metallic piece or component is aligned or proximally oriented with respect to the switch (e.g., such that the disc is properly oriented on the player), the change in capacitance may be detected by the switch and the audio device player may be operable or ready to play the audio files in response to activation of the switches. In some embodiments, the metallic material may be positioned on the audio device player and the capacitive switch on the discs. In yet further embodiments, multiple switches or metallic components may be provided with the discs or audio player for proper alignment or orientation. Another way or manner to detect the orientation or ensure alignment is by using a hall sensor in the player and a off-center magnet in the disc or vice versa. In some embodiments, more than one hall sensor or off-center magnet may be provided. For example, several off-center magnets may be provided corresponding to different pictograms on the disc.

In some embodiments, the disc 14 itself is not pressed to activate the switches 12 but is used as a "map" to tell or indicate to the user which switch 12 to press in order to play content that is associated with the adjacent pictogram 16. Such an example is shown in FIG. 4. As such, the disc could be rigid or even somewhat flexible.

The discs 14 can be coupled to the player 10 in a variety of ways. For example, the player can include a magnet 18 that attracts a corresponding magnetic or metallic material on the disc, or vice versa. Other removable attachment techniques include the use of a hook and loop fastener material, snaps, hooks, adhesives or the like. In some embodiments the discs 14 can be held inside the player with a live hinge. For example, a live plastic hinge inside the player spreads as the disc is inserted. The spring force of the hinge pinches the disc and holds it in place in the player.

Each of the discs 14 activates a set of files located in a file folder related to the theme of the disc stored on the flash memory or on another device linked via wireless technology such as Bluetooth. For example a disc featuring pictograms of songs will activate the song files located in the songs folder; or a disc featuring icons of animals will activate the files located in the animal sounds file folder. Each disc can be recognized by the player, and associated with its respective file folder in a variety of ways. For example, the player can include a set of 5 pins that push a set of 5 micro switches in any number of combinations. For example, a disc with 3 pins pressing on 3 of the 5 micro switches will be associated with the songs folder. Another way for the discs to be recognized is using RFID technology whereby each disc contains an RFID tag with a number stored and the player's RFID reader is used to recognize the correct disc.

Audio files stored in the digital music player 10 or on the discs' flash memory or on another wireless device can be of any type such as music, songs, sounds or voice recordings. An example of an audio file would be the song "The Wheels On The Bus". A disc featuring a pictogram representing a bus would be placed on the digital music player, whereby the pictogram is next to or covering a switch linked to the file of the song. When the bus picture is pressed, the switch behind the disc is pressed and thereby the playback functionality of the song is activated.

In some embodiments where the pictograms 16 are adjacent to the switches 12, the child presses directly on the switch 12 to activate the audio file. Examples are shown in FIGS. 2-4, 6, 7 and 8*a*.

The invention has now been described in detail for purposes of clarity and understanding. However, it will be appreciated that certain changes and modifications may be practiced within the scope of the appended claims.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth. The term "or" in reference to a list of two or more items, covers all of the following interpretations of the word: any of the items in the list, all of the items in the list, and any combination of items in the list.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A digital audio device, comprising:

a digital audio player comprising multiple switches that are configured to activate specific audio files stored on a flash memory or a second device linked via wireless technology;

at least one disc featuring pictograms, words or numbers representing different audio files stored on the flash memory or the second device linked via wireless technology; and an alignment feature for detecting an orientation of the at least one disc in relation to the multiple switches, wherein the alignment feature detects a rotational position of the disc relative to the multiple switches and associates the pictograms with the multiple switches based on the rotational position of the at least one disc.

2. The digital audio device of claim 1, wherein the wireless technology comprises Bluetooth.

3. The digital audio device of claim 1, wherein the audio files are stored on flash memory of the digital audio player.

4. The digital audio device of claim 1, wherein the audio files are stored on flash memory of the disc.

5. The digital audio device of claim 1, wherein the audio files are stored on the second device.

6. The digital audio device of claim 5, wherein the second device comprises at least one of a computer, tablet, or smart phone.

7. The digital audio device of claim 1, wherein the alignment feature operatively couples the disc to the digital audio player in a desired orientation.

8. The digital audio device of claim 7, wherein the alignment feature comprises at least one of corresponding keyed features or magnets.

9. The digital audio device of claim 1, wherein the alignment feature includes a metallic component coupled to the at least one disc and a capacitive switch coupled to the digital audio player.

10. The digital audio device of claim 1, wherein when the disc is configured to at least one of partially cover, completely cover, or be positioned adjacent the switches when operatively coupled to the digital audio player.

11. The digital audio device of claim 1, wherein the alignment feature comprises a hall effect sensor on the digital audio player and a magnet positioned off-center on the at least one disc.

12. The digital audio device of claim 1, wherein the at least one disc has curved sides.

13. A method for activating audio files, comprising:

positioning a disc featuring one or more pictograms that are configured to be positioned over or adjacent to a plurality of switches of a digital audio player, whereby each pictogram corresponds to at least one of the plurality of switches;

detecting a rotational position of the disc relative to the plurality of switches with an alignment feature; and associating each pictogram with at least one of the plurality of switches, such that each switch activates an audio file represented by an associated pictogram when a corresponding switch is depressed.

14. The method for activating audio files of claim 13, wherein the disc is positioned such that the one or more pictograms partially cover the plurality of switches.

15. The method for activating audio files of claim 13, wherein the disc is positioned such that the one or more pictograms completely cover the plurality of switches.

16. The method for activating audio files of claim 13, wherein the disc is positioned such that the one or more pictograms are adjacent the plurality of switches without covering the switches.

17. The method for activating audio files of claim 13, wherein the disc and the digital audio player include corresponding alignment features for positioning the pictograms properly with respect to the plurality of switches.

18. The method for activating audio files of claim 17, wherein the alignment features include a corresponding metallic component coupled to the disc and a capacitive switch coupled to the digital audio player.

19. The method for activating audio files of claim 13, further comprising depressing a switch of the plurality of switches to activate the audio file represented by the pictogram.

20. The method for activating audio files of claim 13, wherein the audio files are stored on flash memory of the digital audio player.

21. The method for activating audio files of claim 13, wherein the audio files are stored on flash memory of the disc.

22. The method for activating audio files of claim 13, wherein the audio files are stored on a second device in wireless communication with the digital audio player.

23. The method for activating audio files of claim 13, wherein the alignment feature comprises a hall effect sensor on the digital audio player and a magnetic positioned off-center on the disc.

24. The method for activating audio files of claim 13, wherein the alignment feature comprises a metallic component coupled to the disc and a capacitive sensor coupled to the digital audio player to detect the metallic component.

* * * * *